(12) United States Patent
Mizutani et al.

(10) Patent No.: US 8,129,621 B2
(45) Date of Patent: Mar. 6, 2012

(54) WIRE HARNESS FIXING TOOL

(75) Inventors: Tatsuhiko Mizutani, Toyota (JP); Toshiya Sugiyama, Toyota (JP); Hiroshi Kato, Nukata-gun (JP); Hideki Hattori, Yokkaichi (JP); Tsutomu Sakata, Yokkaichi (JP); Atsushi Fujisawa, Yokkaichi (JP)

(73) Assignees: Toyota Jidosha Kabushiki Kaisha, Aichi-Ken (JP); Sumitomo Wiring Systems, Ltd., Yokkaichi-shi (JP)

( * ) Notice: Subject to any disclaimer, the term of this patent is extended or adjusted under 35 U.S.C. 154(b) by 317 days.

(21) Appl. No.: 12/528,745

(22) PCT Filed: Feb. 22, 2008

(86) PCT No.: PCT/JP2008/053583
§ 371 (c)(1),
(2), (4) Date: Aug. 26, 2009

(87) PCT Pub. No.: WO2008/105523
PCT Pub. Date: Sep. 4, 2008

(65) Prior Publication Data
US 2010/0116524 A1 May 13, 2010

(30) Foreign Application Priority Data

Feb. 27, 2007 (JP) .................................. 2007-047589

(51) Int. Cl.
*H02G 3/32* (2006.01)

(52) U.S. Cl. ...................... 174/135; 174/68.3; 174/72 C; 439/360; 248/56

(58) Field of Classification Search ................. 174/68.3, 174/72 A, 70 R, 74 R, 135.72 A; 439/360; 248/49, 56
See application file for complete search history.

(56) References Cited

U.S. PATENT DOCUMENTS

| 5,739,470 A * | 4/1998 | Takeda ............................ 174/97 |
| 6,460,642 B1 | 10/2002 | Hirano |
| 7,060,903 B2 * | 6/2006 | Tsubaki ...................... 174/72 A |
| 7,307,216 B2 * | 12/2007 | Terada ........................ 174/72 A |
| 7,729,132 B2 * | 6/2010 | Yamamoto et al. ........... 361/826 |

FOREIGN PATENT DOCUMENTS

| JP | 60-018683 A | 1/1985 |
| JP | 05-091119 U | 12/1993 |
| JP | 06-062718 U | 9/1994 |
| JP | 2000-152470 A | 5/2000 |

* cited by examiner

*Primary Examiner* — Dhirubhai R Patel
(74) *Attorney, Agent, or Firm* — Sughrue Mion, PLLC

(57) ABSTRACT

The fixing tool (40) of a wire harness (32) bundling a plurality of cables has a portion (42) for holding the wire harness (32), and two protrusions (44) protruding therefrom. The protrusion (44) includes a stretching portion (46) formed by stretching. Since the length from the base face (48) of the holding portion (42) to the stretching portion (46) is different in different protrusions (44), the timing at which each stretching portion (46) is inserted into a through hole (56) varies and thereby insertion load of the protrusion (44) can be reduced. Consequently, workability of a work for securing the wire harness (32) to a bracket (54) can be improved.

6 Claims, 3 Drawing Sheets

WIRE HARNESS FIXING TOOL

TECHNICAL FIELD

The present invention relates to a wire harness fixing tool for fixing a wire harness bundling a plurality of cables.

BACKGROUND ART

Wire harnesses in which a plurality of cables is bundled are commonly used for routing cables through a vehicle body or the like. Such wire harnesses are typically fixed to structures that serve as a fixing counterpart, such as a bracket provided on a vehicle body, at predetermined intervals using fixing tools.

Japanese Patent Laid-Open Publication No. 2000-152470 describes a wire harness fixing tool which has a holding portion for holding a wire harness and two protrusions protruding therefrom, and fixes a wire harness by inserting these protrusions in holes formed in brackets on vehicle bodies. When this fixing tool is employed, protrusions are elastically deformed when inserted into the holes, and the elastic force connects the protrusions with the bracket, thereby fixing a wire harness to the bracket.

DISCLOSURE OF THE INVENTION

Problem to be Solved by the Invention

In the case of the wire harness fixing tool disclosed in Japanese Patent Laid-Open Publication No. 2000-152470, when two protrusions are simultaneously inserted into holes in a bracket, these protrusions must be elastically deformed simultaneously. Therefore, when a fixing tool has a plurality of protrusion as mentioned above, the force required to insert these protrusions into the holes in a structure that serves as a fixing counterpart while elastically deforming the protrusions becomes large, thereby reducing workability. On the other hand, if the number of protrusions are reduced, or limited to one, for example, in consideration of workability, movement of the wire harness relative to the structure that serves as a fixing counterpart due to vibration of the vehicle or the like increases, and the protrusions joining those parts may be damaged.

The present invention addresses the above-described problems while simultaneously further advantageously providing a wire harness fixing tool with improved workability when fixing a wire harness to a structure that serves as a fixing counterpart which creates wire harness fixtures with improved durability.

SUMMARY OF THE INVENTION

In a first aspect, the present invention provides a wire harness fixing tool for fixing a wire harness bundling a plurality of cables to a structure that serves as a fixing counterpart comprising a holding portion for holding the wire harness and a plurality of protrusions protruding from the holding portion to be inserted into through holes formed in the structure, wherein the protrusion includes a stretching portion formed by stretching; the stretching portion elastically deforms to pass through said through hole, and gets caught by an inner periphery edge thereof to be joined to the structure; and each protrusion includes at least two types of protrusions with different lengths between the holding portion and the stretching portion.

According to a second aspect, the present invention provides a wire harness fixing tool for fixing a wire harness bundling a plurality of cables to a structure that serves as a fixing counterpart comprising a holding portion for holding the wire harness; and a protrusion protruding from the holding portion to be inserted into a through hole formed in the structure and an intersecting face formed on the holding portion and intersecting a surface on which the protrusion is provided, wherein the protrusion includes a stretching portion formed by stretching; the stretching portion elastically deforms to pass through the through hole, and gets caught by an inner periphery edge thereof to be joined to the structure; and the intersecting face contacts a part of the structure when the stretching portion is connected to the structure.

Further, according to a third aspect, the present invention is a wire harness fixing tool for fixing a wire harness bundling a plurality of cables to a structure that serves as a fixing counterpart comprising a holding portion for holding the wire harness and a pair of protrusions protruding from the holding portion to be inserted into through holes formed in the structure, wherein the pair of protrusions includes a stretching portion formed by stretching on opposite sides from each other; the stretching portion elastically deforms to pass through the through hole, and gets caught by an inner periphery edge thereof to be joined to the structure; and the pair of protrusions bend in the direction opposing each other when the stretching portion passes through the through hole.

Advantageous Effect of the Invention

Employing a wire harness fixing tool according to the first aspect of the present invention makes it possible to improve workability of fixing a wire harness to a structure that serves as a fixing counterpart while simultaneously improving durability of the fixing tool.

Employing a wire harness fixing tool according to the second aspect of the present invention makes possible further improvement in the durability of the fixing tool.

Yet further, employing a wire harness fixing tool according to the third aspect of the present invention also enables improvement in the workability of fixing a wire harness to a structure that serves as a fixing counterpart, while simultaneously improving durability of the fixing tool.

DESCRIPTION OF REFERENCE NUMBERS

32 wire harness, 40 fixing tool, 42 holding portion, 44 protrusion, 46 stretching portion, 48 base face, 54 bracket, 56 through hole

BEST MODE FOR CARRYING OUT THE INVENTION

An embodiment of the wire harness fixing tool according to the present invention will be described with reference to the drawings. A vehicle that runs on outputs from an internal combustion engine and a motor generator, that is, a hybrid vehicle, will be described as an example illustrative application of a fixing tool according to the present invention, which is employed for fixing a wire harness within this vehicle. However, the present invention is not limited to use in hybrid vehicles, but is obviously also applicable to a wire harness fixing tool for fixing wire harnesses in internal combustion engine vehicles.

Figure 1:
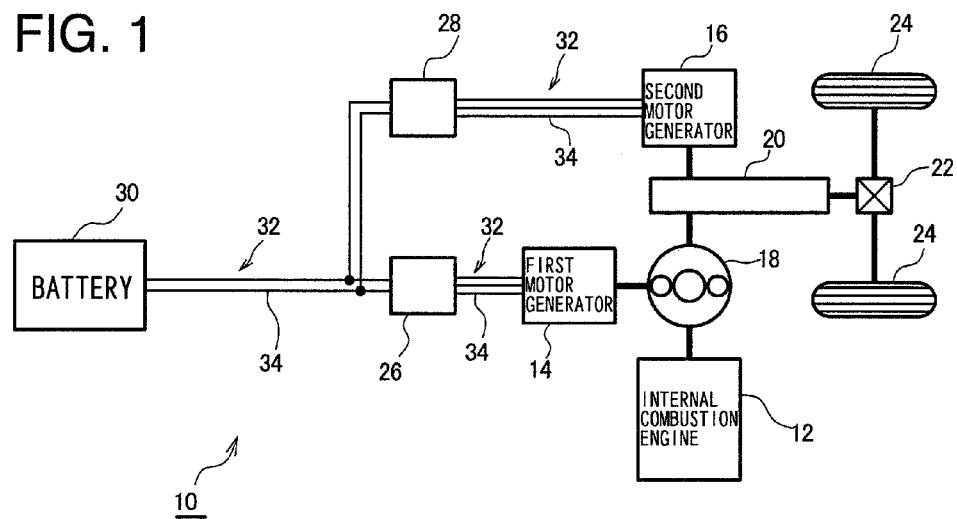
FIG. 1 is a schematic diagram of a hybrid vehicle to which the present invention is applied.

First, referring to FIG. 1, the configuration of an example hybrid vehicle 10 to which a fixing tool 40 of the present embodiment is applicable will be described. FIG. 1 illustrates a schematic configuration of the hybrid vehicle 10.

The hybrid vehicle 10 has an internal combustion engine 12, a first motor generator 14, and a second motor generator 16 as motors. A power distribution and integration mechanism 18 is connected to motors 12, 14, and 16 for distributing and integrating their outputs. A drive wheel 24 is connected to the power distribution and integration mechanism 18 via a gear mechanism 20 and a final reduction mechanism 22. The gear mechanism 20 transmits the revolution of the output shaft of the power distribution and integration mechanism 18 while changing its speed. The final reduction mechanism 22 includes a differential mechanism for absorbing the revolution difference between right and left drive wheels 24, and transmits the output from the gear mechanism 20 to the drive wheel 24. Configuring the power transmission system of the hybrid vehicle 10 in this manner allows the outputs from the respective motors 12, 14, and 16 and integrated by the power distribution and integration mechanism 18 to be transmitted to the drive wheel 24 via the gear mechanism 20 and the final reduction mechanism 22, to thereby drive the hybrid vehicle 10.

The hybrid vehicle 10 may be operated in various modes by controlling the outputs from the internal combustion engine 12 and the first and the second motor generator 14, 16 depending on the driving state. For example, the vehicle may be operated in various modes such as running on either one of the internal combustion engine 12 or the second motor generator 16, running by coordinating the internal combustion engine 12 and the second motor generator 16, or generating electricity by the first motor generator 14 using a part of the output from the internal combustion engine 12. Further, during deceleration, regeneration by the second motor generator 16 using the kinetic energy of the hybrid vehicle 10 input from the drive wheel 24 may be enabled.

The first motor generator 14 and the second motor generator 16 are electrically connected to a battery 30 via first and second inverters 26, 28, respectively. The first motor generator 14 is connected to the first inverter 26 via a wire harness 32 bundling three cables 34, and the first inverter 26 is connected to the battery 30 via the wire harness 32 bundling two cables 34. The second motor generator 14 is connected to the second inverter 28 via the wire harness 32 bundling three cables 34, and the second inverter 28 is connected to the battery 30 via the wire harness 32 bundling two cables 34. The motor generators 14, 16 are synchronous motors which are capable of functioning as electric motors that drive the hybrid vehicle 10 and at the same time are capable of functioning as generators. The battery 30 stores electric power supplied by the motor generators 14, 16. The inverters 26, 28 convert the direct current electric power from the battery 30 into three-phase alternating current electric power and supply it to the motor generators 14, 16, respectively. When the motor generators 14, 16 function as generators, the inverters 26, 28 convert the three-phase alternating current electric power from the motor generators 14, 16 and supply the converted current to the battery 30.

Figure 2:
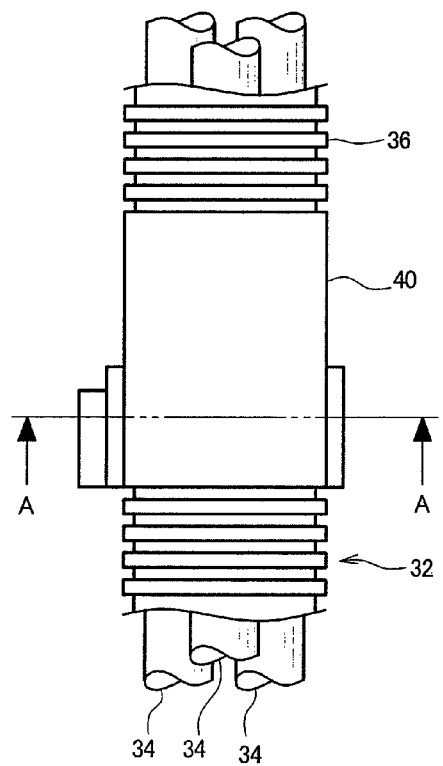
FIG. 2 is a plan view showing a schematic configuration of a wire harness fixing tool according to the present invention.
Figure 3:
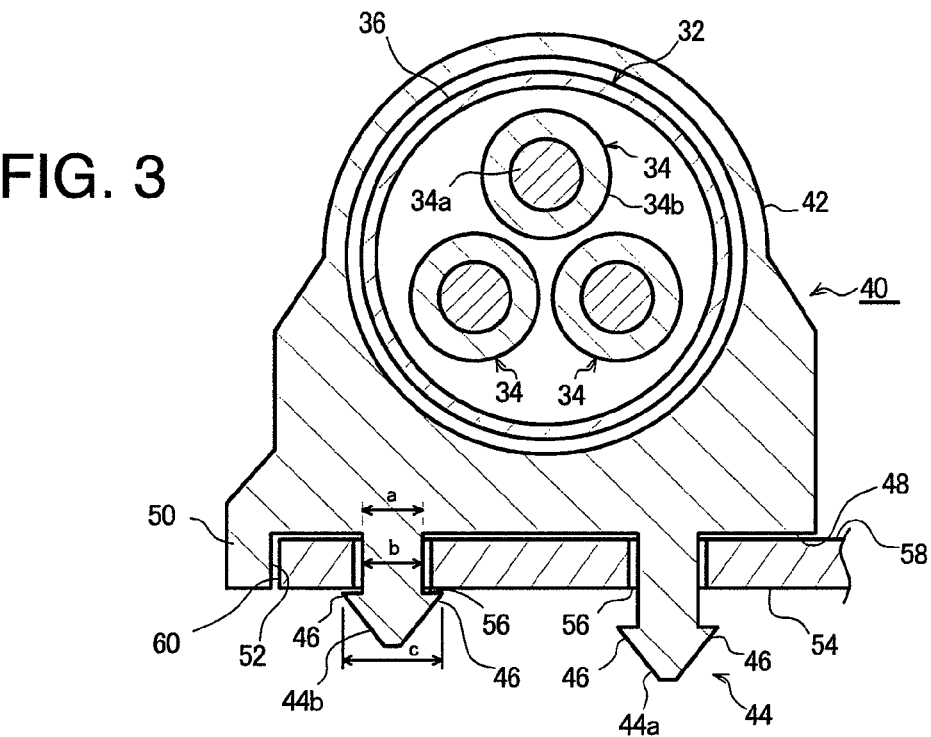
FIG. 3 is a sectional view of a fixing tool as seen from A-A of FIG. 2.

Next, the fixing tool 40 for fixing the wire harness 32 to a structure shall be described while referring to FIGS. 2 and 3. FIG. 2 is a plan view illustrating the schematic structure of the fixing tool 40 of the wire harness 32 according to the present embodiment. FIG. 3 is a sectional view of the fixing tool 40 as seen from A-A of FIG. 2. The wire harness 32 connecting the first motor generator 14 and the first inverter 26, that is, the wire harness 32 bundling three cables 34, will be described as an example, one in which the fixing tool 40 is employed for fixing the wire harness 32 to a bracket 54. However, the present invention is not limited to wire harnesses connecting motor generators and inverters, but is also applicable to fixing tool for fixing wire harness of other devices. Also, the present invention is not limited to wire cables bundling three cables, but also applicable to wire harnesses bundling any number of cables.

In this example, the wire harness 32 comprises three cables 34 bundled together and a corrugated tube 36 that accommodates the cables. The cable 34 is made up of a conductive material 34a such as copper and a flexible insulating material 34b covering the conductive material. The corrugated tube 36 is a flexible tube with a bellows-like structure.

The fixing tool 40 has a holding portion 42 for holding the wire harness 32 and a protrusion 44 protruding therefrom. The inner periphery of the holding portion 42 is formed with a bellows-like structure which fits with the bellows-like outer periphery of the corrugated tube 36. If the holding portion 40 is provided such that it covers the outer periphery of the corrugated tube 36, the two bellows shapes fit with each other, and retain the wire harness 32.

The protrusion 44 is formed on the holding portion 42, and two protrusions are provided on the base face 48. Hereafter, the longer of the two protrusions 44 will be referred to as the first protrusion 44a and the shorter of the two will be referred to as the second protrusion 44b. The protrusion 44 is made from an elastically deformable elastic material, such as, for example, a synthetic resin material. The protrusion 44 includes a stretching portion 46 formed by stretching. The stretch portion 46 is formed such that it has a wedge-shaped cross section gradually spreading from the end portion of the protrusion 44 in the radial direction. The stretching portion 46 may be formed such that the cross section in the entire direction of the protrusion 44 is wedge-shaped, or it may be formed such that only the cross section in a certain direction is wedge-shaped on both sides, such as in the present example. Also, the stretching portion 46 is formed such that the lengths thereof from the base face 48 to the stretching portion 46 of the protrusion 44 are different. That is, the length of the first protrusion 44a from the base face 48 to the stretching portion 46 is longer than that of the second protrusion 44b.

Further, the holding portion 42 has a contacting portion 50 that comes in contact with a bracket 54 when the wire harness 32 is fixed to the bracket 54. An intersecting face 52 that intersects the base face 48 is formed on the contacting portion 50. A plane intersecting the base face 48 refers to a plane that intersects the plane defined to include the base face 48. The intersecting face 52 comes into contact with the end face 60 of the bracket 54 (described below), so as to control the movement of the wire harness in the direction parallel to the base face 48. The intersecting face 52 of the present embodiment is formed such that it is orthogonal to the base face 48. The intersecting face 52 is in contact with the end face 60 in such a manner that the intersecting face 52 is orthogonal to the force of wire harness 32 exerted in parallel with respect to the base face 48, to thereby securely prevent movement of the wire harness 32.

The bracket 54 is a structure that serves as a fixing counterpart of the wire harness 32, and is directly fixed to a vehicle body, for example. On the bracket 54, an end face 60 is formed at the end thereof and a fixing tool support face 58 for supporting the fixing tool 40 is formed. The intersecting face 52 of the fixing tool 40 comes into contact with the end face 60 when the wire harness 32 is fixed on the bracket 54. A through hole 56 through which the protrusion 44 is inserted is formed in the fixing tool support face 58. The inside diameter a of the through hole 56 is smaller than the length c across the portion where stretching portion 46 is formed, and is larger than the length b of the body part of the protrusion 44. Further, the length of the through hole 56, in other words the thickness of the bracket 54 is smaller than the length between the base face 48 and the stretching portion 46. Forming the through hole 56 in such a shape allows the stretching portion 46 having a length c larger than the inside diameter a to pass through the through hole 56 while elastically deforming being compressed for the inner side of the protrusion 44 when the protrusion 44 is inserted in the through hole 56. Then, after the protrusion has passed through the through hole 56, the stretching portion 46 that had been compressed restores its original shape with the length c, and is caught on the inner periphery edge of the through hole 56, thereby preventing the movement of the protrusion 44 in the direction to be pulled out.

Movement of first and second protrusions 44a, 44b when the wire harness 32 is fixed to the bracket 54 via the fixing tool 40 will be explained. The protrusions 44a, 44b of the fixing tool 40 holding the wire harness 32 with the holding portion 42 is inserted into the through hole 56 of the bracket 54. At this time, the first protrusion 44a longer than the second protrusion 44b is first inserted into the through hole 56, and then the second protrusion 44b is inserted into the through hole 56. Further, because the length between the base face 48 and the stretching portion 46 of the first protrusion 44a is longer than that of the second protrusion 44b, the stretching portion 46 of the first protrusion 44a is first inserted in the through hole 56, and then the stretching portion 46 of the second protrusion 44b is inserted into the through hole 56. Because the timing at which stretching portions 46 of the first and the second protrusions 44a, 44b inserted into a through hole 56 varies, the timing at which the stretching portions 46 elastically deform also varies. An effect of varying the insertion timings is that the force required for elastically deforming the stretching portion 46 is distributed, thereby reducing insertion load of the protrusion 44. Then, the stretching portion 46 that has passed through the through hole 56 is caught on the inner periphery edge of the through hole 56 and becomes connected to the bracket 54, and the wire harness 32 is fixed to the fixed bracket 54.

With the fixing tool 40 according to the present embodiment, because the length from the base face 48 of the holding portion 42 to the stretching portion 46 is different in different protrusions 44, the timing at which each stretching portion 46 is inserted into a through hole 56 varies and accordingly insertion load of the protrusion 44 can be reduced. Consequently, workability of a work for securing the wire harness 32 to the bracket 54 can be improved. Also, by not limiting the number of protrusions 44 provided on the fixing tool 40 to two, and providing more than two protrusions, durability in addition to workability can be improved.

Further, with the fixing tool 40 according to the present embodiment, the intersecting face 52 of the holding portion 42 comes into contact with the end face 60 of the bracket 54 when the wire harness 32 is secured to the bracket 54. This contact limits the movement of the wire harness 32 in the direction intersecting the intersecting face 52, which then reduces stress on the protrusion 44 generated by vehicle vibrations, controlling damage to the protrusion 44 thereby. Consequently, durability of the fixing tool 40 can be improved. Further, the portion of the holding portion 42 that contacts the bracket 54 is not limited to the intersecting face 52 or any one location, but an intersecting face for contacting may be formed, for example, on a portion of the bracket 54 such that the movement of the wire harness 32 in other direction is further controlled.

Figure 4:
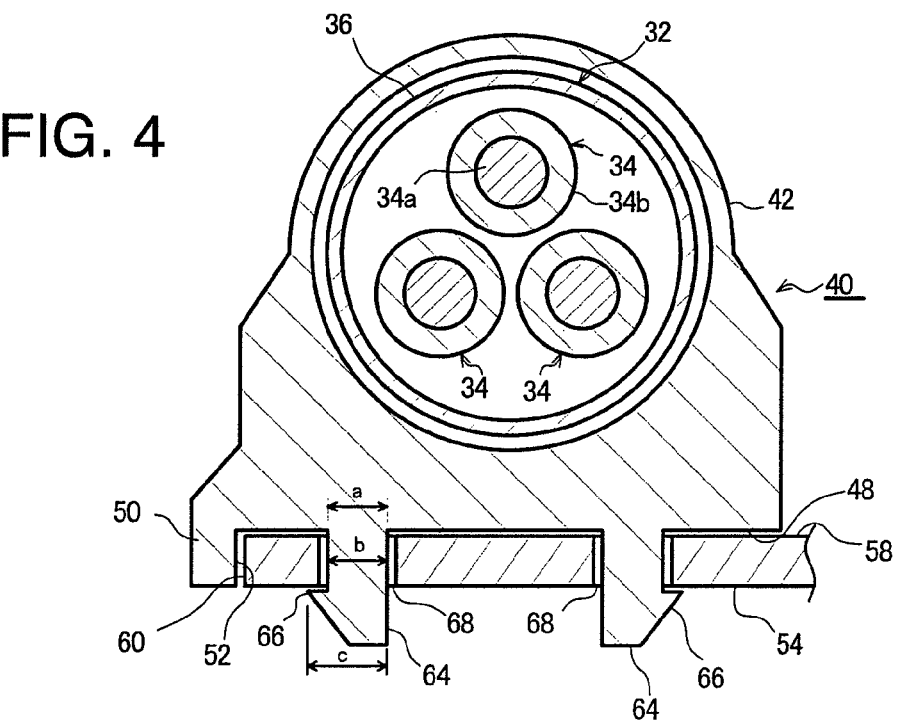
FIG. 4 is a sectional view of another fixing tool as seen from A-A of FIG. 2.

Next, an example fixing tool 40 according to another aspect of the present invention will be explained with reference to FIG. 4. Fig. is a sectional view of another fixing tool 40 as seen from A-A of FIG. 2. The same reference numbers will be given to components similar to those in the example described above, and their detailed explanation will not be repeated.

Two protrusions 64 protruding from the base face 48 are provided on the holding portion 42 so as to form a pair. The protrusions 64 are of the same length, and each has a stretching portion 66 formed by stretching. The stretching portion 66 is formed on one side of the protrusion 64 in a shape with wedge-shaped cross section spreading gradually from the end of the protrusion 64 such that the two protrusions 64 are symmetric. Although the stretching portions 66 of the present example are formed on the side of each protrusion 64 opposite the side facing each other, the structure is not limited to this, but, for example, the protrusions 64 may be formed facing each other. Further, the stretching portion 66 is formed such that the lengths from the base face 48 to the stretching portion 66 in each protrusion 64 are the same. Accordingly, the two protrusions 64 are formed with symmetrical shapes.

The inside diameter of a through hole 68 formed in the bracket 54 is less than or equal to than the length c across the portion where stretching portion 66 is formed, and is larger than the length b of the body part of the protrusion 64. The length of the through hole 68 is smaller than the length between the base face 48 and the stretching portion 66. Because the through hole 68 has such a shape, when the protrusion 64 is inserted into the through hole 68, a reaction force resulting from the stretching portion 66 coming into contact with the through hole 68 causes the protrusion 64 to bend in the direction of the reaction force until it contacts the through hole 68. Consequently, the clearance in the through hole 68 where the stretching portion 66 passes through becomes greater, thereby allowing the stretching portion 66 to pass without elastically deforming. Also, even when the inside diameter a is smaller than the length c across the portion where stretching portion 66 is formed, bending of the protrusion 64 controls elastic deformation of the stretching portion 66 to a small degree.

The behavior of the protrusion 64 when the wire harness 32 is fixed to the bracket via the fixing tool 40 will now be described. The protrusion 64 of the fixing tool 40 holding the wire harness 32 by the holding portion 42 is inserted into the through hole 68 of the bracket 54. Because the protrusions 64 are provided in pairs, the stretching portions of the respective protrusions 64 are at this point inserted simultaneously into the through holes 68 while contacting thereon. The reaction force generated by this contact causes the protrusion 64 to bend in the direction of the reaction force until it contacts the through hole 68. That is, the pair of protrusions 64 bend towards each other. This bending expands the clearance in the through hole where the stretching portion 66 passes through, whereby the stretching portion 66 passes through the through hole without elastically deforming, or while only slightly elastically deforming. The elastic deformation of the stretching portion 66 is in this manner reduced, and insertion load of the protrusion 64 can be reduced thereby. Then, the stretching portion 66 that has passed through the through hole 68 is caught on the inner periphery edge thereof and thus connected to the bracket 54, the wire harness 32 is connected to the bracket 54.

By employing the fixing tool 40 of the present example, the protrusion 64 may be bent in the through hole 68, because the stretching portion 66 is formed only on one side of the protrusion 64. This bending reduces elastic deformation of the stretching portion 66, reducing insertion load of the protrusion 64 thereby. Consequently, the workability of fixing the wire harness 32 to the bracket 54 can be improved. Further, by not limiting the number of protrusions 64 provided on the fixing tool 40 to two, but instead providing more protrusions 64, the durability can be improved along with workability. Additionally, because all of the protrusions 64 are symmetric to each other, the stretching portions 66 are prevented from coming off from the inner periphery edge of the through hole 68 simultaneously due to displacement of the wire harness 32 with respect the bracket 54. For example, if the wire harness 32 is displaced toward the end of the bracket 54, the stretching portion 66 of the protrusion 64 located distant from the end of the bracket 54 that catches on the inner periphery of the through hole 68 is reduced, but the portion of the stretching portion 66 of the protrusion 64 located closer to end that will be caught on the inner periphery edge of the through hole 68 will be increased, thereby preventing the stretching portions 64 from simultaneously coming off from the inner periphery edge of the through hole 68.

Further, according to the fixing tool 40 of the present embodiment, when the wire harness 32 is fixed to the bracket 54, the intersecting face 52 of the holding portion 42 contacts the end face 60 of the bracket 54 as shown by the above-mentioned embodiment. Through this contact, displacement of the wire harness 32 in the direction intersecting the intersecting face 52 is controlled, reducing stress on the protrusion 64 generated by vehicle vibrations, and therefore controlling damage on the protrusion 64. Accordingly, durability of the fixing tool 40 can be improved.

Figure 5:
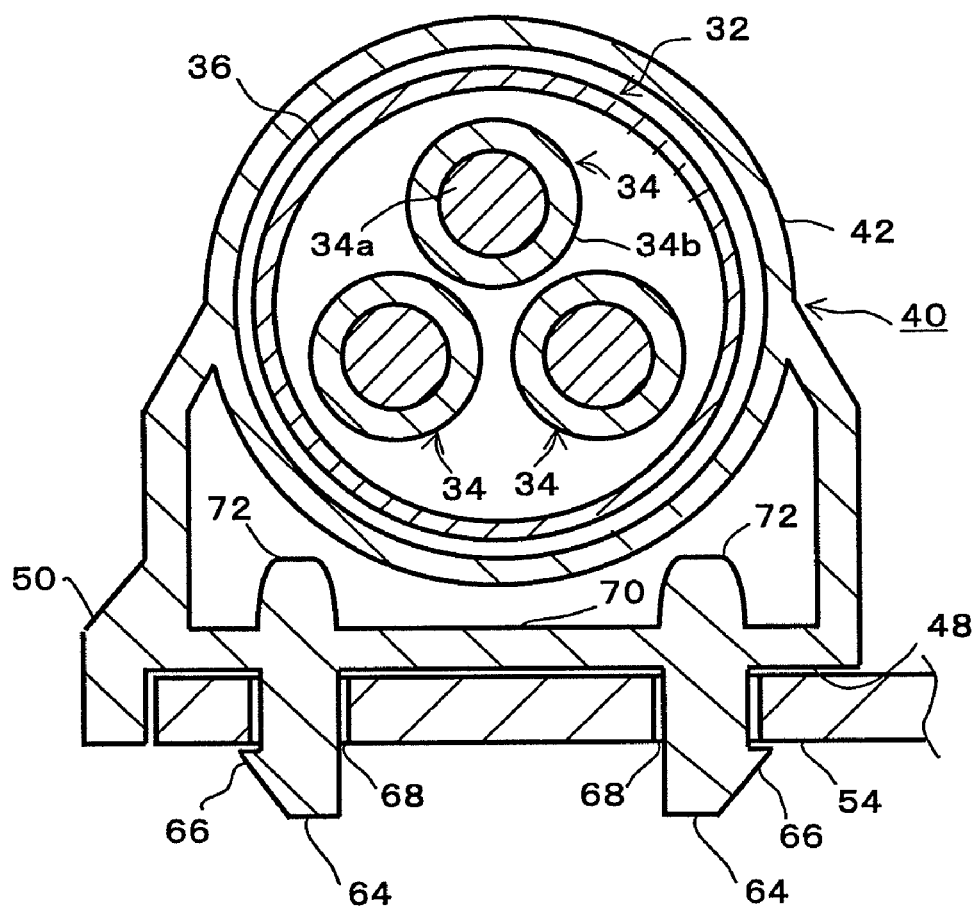
FIG. 5 is a sectional view of yet another fixing tool as seen from A-A of FIG. 2.

Next, an example fixing tool 40 according to yet another aspect of the present invention will be described with reference to FIG. 5. FIG. 5 is a sectional view of another fixing tool 40 as seen along A-A in FIG. 2. Similar components as those of the examples described above will be assigned the same reference number, and their detailed explanation will not be repeated.

In this example, the holding portion 42 has a rib 72 for reinforcing the protrusion 64. The rib 72 is provided on the back face 70 located on the back side of the base face 48 formed on the thin portion thereof. The portion where the rib 72 is provided on the back face 70 is the portion corresponding to the back side of the base face 48 where the protrusion 64 protrudes.

In the fixing tool 40 of the present example, the rib 72 reinforces the protrusion 64 and distributes stress generated in the protrusion 64, reducing stress generated in the protrusion 64 due to vehicle vibrations, thereby controlling damage on the protrusion 64. Consequently, durability of the fixing tool 40 after being fixed can be improved.

While each of the examples described above was described with reference to cases wherein the positions of the stretching portions 46, 66 are at the ends of the protrusions 44, 64, the present invention is not limited to such configurations. The stretching portions 46, 66 need not be located at the end of protrusions 44, 64 if the lengths from the base face 48 to the protrusions 46, 66 are larger than the lengths of the through holes 56, 68.

Further, while the above examples were described using examples wherein a counterpart for fixing the wire harness 32 is a bracket 54 provided on a vehicle, the present invention is not limited to this configuration. For example, the counterpart for fixing the wire harness 32 may be some other fixing tool fixed on the bracket.

Further, while each of the above examples was described with reference to cases wherein the fixing tool 40 is provided with an intersecting face 52 and protrusions 44, 64 formed in characteristic shapes, the present invention is not limited to such configuration. Even if the protrusions 44, 64 formed in characteristic shapes are not provided on the fixing tool 40, the intersecting face 52 contacts the end face 60 of the bracket 54 when the wire harness 32 is fixed to the bracket, and displacement of the wire harness 32 is controlled, thereby controlling damage on the protrusions 44, 64, and therefore improving durability of the fixing tool 40.

The invention claimed is:

1. A wire harness fixing tool for fixing a wire harness bundling a plurality of cables to a structure that serves as a fixing counterpart, comprising:
    a holding portion for holding the wire harness; and
    a plurality of protrusions protruding from said holding portion to be inserted into through holes formed in said structure, wherein
    each of said protrusions includes a stretching portion formed by stretching;
    said stretching portion elastically deforms to pass through said through hole, and is joined to said structure when caught by an inner periphery edge of said through hole;
    each of said protrusions includes at least two types of protrusions with different lengths between said holding portion and said stretching portion;
    said holding portion has a rib for reinforcing one of said protrusions; and
    said rib is formed on a portion at a back face of said holding portion corresponding to a back side of a portion of a surface at which said one of said protrusions protrudes from said holding portion.

2. A wire harness fixing tool according to claim 1, wherein said structure is a holding portion of another wire harness fixing tool.

3. A wire harness fixing tool according to claim 1, wherein the wire harness connects a motor generator that drives a vehicle and an inverter that supplies electric power to this motor generator by converting the electric power from direct current to alternating current.

4. A wire harness fixing tool for fixing a wire harness bundling a plurality of cables to a structure that serves as a fixing counterpart, comprising:
    a holding portion for holding the wire harness; and
    a protrusion protruding from said holding portion to be inserted into a through hole formed in said structure; and
    an intersecting face formed on said holding portion and intersecting a base face on which said protrusion is provided, said intersecting face extending substantially perpendicularly from said base face in the direction said protrusion protrudes, wherein
    said protrusion includes a stretching portion formed by stretching;

said stretching portion elastically deforms to pass through said through hole, and is joined to said structure when caught by an inner periphery edge of said through hole; and said intersecting face contacts a portion of said structure such that it opposes an end face of said structure when said stretching portion is connected to said structure.

5. A wire harness fixing tool according to claim 4, wherein said holding portion contains a rib for reinforcing said protrusion; and said rib is formed on a portion at a back face of said holding portion corresponding to a back side of a portion of a surface at which said protrusion protrudes from said holding portion.

6. A wire harness fixing tool for fixing a wire harness bundling a plurality of cables to a structure that serves as a fixing counterpart, comprising:

a holding portion for holding the wire harness; and a pair of protrusions protruding from said holding portion to be inserted into through holes formed in said structure, wherein each of said pair of protrusions includes a stretching portion formed by stretching, said stretching portion of one of said protrusions is formed on a side that is opposite to a side on which said stretching portion of the other of said protrusions is formed;

said stretching portion elastically deforms to pass through said through hole, and is joined to said structure when caught by an inner periphery edge of said through hole;

said pair of protrusions bend in opposing directions when said stretching portion passes through said through hole;

said holding portion has a rib for reinforcing said one of said protrusions; and said rib is formed on a portion at a back face of said holding portion corresponding to a back side of a portion of a surface at which said one of said protrusions protrudes from said holding portion.

* * * * *